350-319
8/31/76   XR   3,977,251

United States Patent [19]
Meginnis

[11] 3,977,251
[45] Aug. 31, 1976

[54] SIGHT GLASS ASSEMBLY
[76] Inventor: Charles E. Meginnis, 591 1/2 Nancy St., Charleston, W. Va. 25302
[22] Filed: Nov. 2, 1973
[21] Appl. No.: 412,256

[52] U.S. Cl............................. 73/334; 220/82 A; 350/319
[51] Int. Cl.² ........................................ G01F 23/02
[58] Field of Search ............ 73/334, 323, 327, 328, 73/330, 331; 116/117 R, 118 R; 350/319; 220/82 R, 82 A

[56]     References Cited
         UNITED STATES PATENTS
| | | | |
|---|---|---|---|
| 1,189,922 | 7/1916 | Daly | 220/82 R |
| 2,693,702 | 11/1954 | Johnson | 73/327 |
| 2,942,469 | 6/1960 | Le Roy | 73/334 |
| 3,194,364 | 7/1965 | Kolm | 220/82 A X |
| 3,407,662 | 1/1968 | Tarbox | 73/330 X |
| 3,556,038 | 1/1971 | Wolfe | 350/319 X |
| 3,625,390 | 12/1971 | Meginnis | 73/334 X |

FOREIGN PATENTS OR APPLICATIONS
572,020   9/1945   United Kingdom................. 73/323

*Primary Examiner*—Richard C. Queisser
*Assistant Examiner*—Joseph W. Roskos
*Attorney, Agent, or Firm*—Mason, Fenwick & Lawrence

[57]     ABSTRACT

A sight glass assembly adapted to be mounted across an opening in a container wall, generally including a housing structure having an opening registrable with the opening in the container wall, the opening having an enlarged section including a pair of spaced opposed wall portions disposed in converging relation, a lens disposed in the enlarged section of the opening having bearing surfaces cooperable with the spaced opposed wall portions of the enlarged section of the housing structure, and sealing means interposed between the opposed wall portions of the enlarged section and the bearing surfaces of the lens.

19 Claims, 8 Drawing Figures

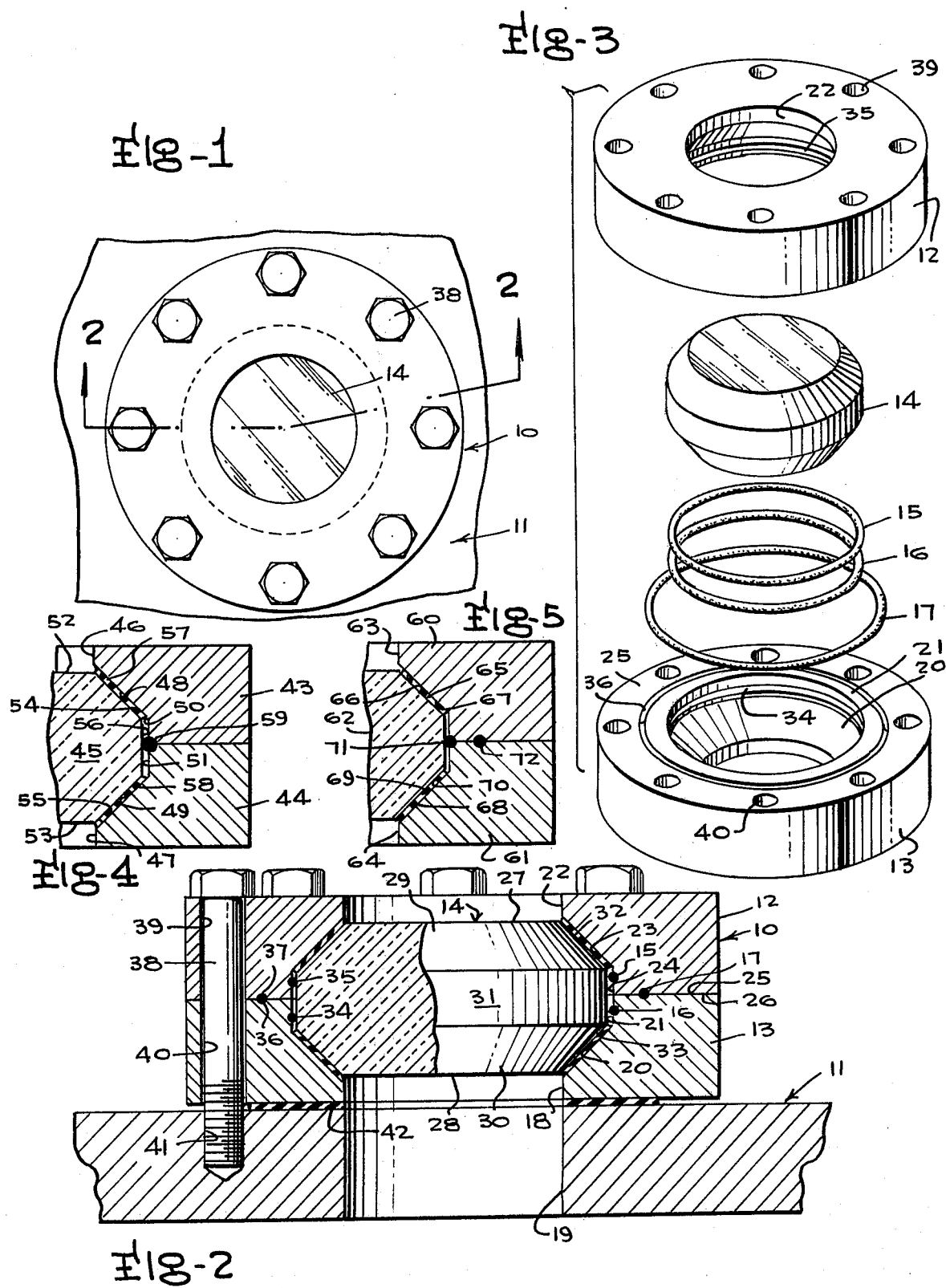

SIGHT GLASS ASSEMBLY

This invention relates to a sight glass assembly, and more particularly to a sight glass assembly suitable for use in environments wherein elevated pressures may be applied to the lens of the assembly, on either side thereof.

In the past, sight glass assemblies generally have been utilized in the chemical and other processing industries to permit operating personnel to view the interiors of fluid containers. Most often, the fluids within such containers are maintained under high pressures and also may be corrosive in nature. More recently, however, sight glass assemblies have been utilized on vessels and vehicles operable in environments wherein the lens of a sight glass assembly is subjected to high pressures on either side thereof. Such vessels and vehicles include aircraft used in conventional air travel and vehicles utilized in outer space exploration, and submersible vessels and vehicles utilized in conventional underwater travel and oceanographic exploration. In many of such applications, it has been found that conventional sight glass assemblies of the type commonly used in the chemical and other processing industries, have not been entirely satisfactory in operating performance.

Accordingly, it is the principal object of the present invention to provide a novel sight glass assembly.

Another object of the present invention is to provide a novel sight glass assembly adapted for use in severe environments wherein the lens thereof is subjected to high pressures.

A further object of the present invention is to provide a novel sight glass assembly particularly adapted for use in severe environments wherein high pressures may be applied to either side of the lens of the assembly.

Another object of the present invention is to provide a novel sight glass assembly adapted for use in aircraft utilized in conventional air travel and more sophisticated vehicles utilized in outer space travel and exploration.

A further object of the present invention is to provide a novel sight glass assembly particularly adapted for use with submersible vehicles utilized in conventional underwater travel and oceanographic exploration.

Another object of the present invention is to provide a sight glass assembly which is simple in construction, easy to assemble, and inexpensive to manufacture.

Other objects and advantages of the present invention will become more apparent to those persons skilled in the art to which the invention pertains, from the following description taken in conjunction with the accompanying drawings, wherein:

FIG. 1 is a front view of an embodiment of the invention mounted across an opening in a container wall;

FIG. 2 is an enlarged cross-sectional view taken along line 2—2 in FIG. 1;

FIG. 3 is a perspective view of the embodiment illustrated in FIG. 1, illustrating the components thereof in exploded relation;

FIG. 4 is a cross-sectional view similar to FIG. 2 illustrating a modification of the invention;

FIG. 5 is a view similar to the view of FIG. 2, illustrating another modification of the invention.

Figure 6:
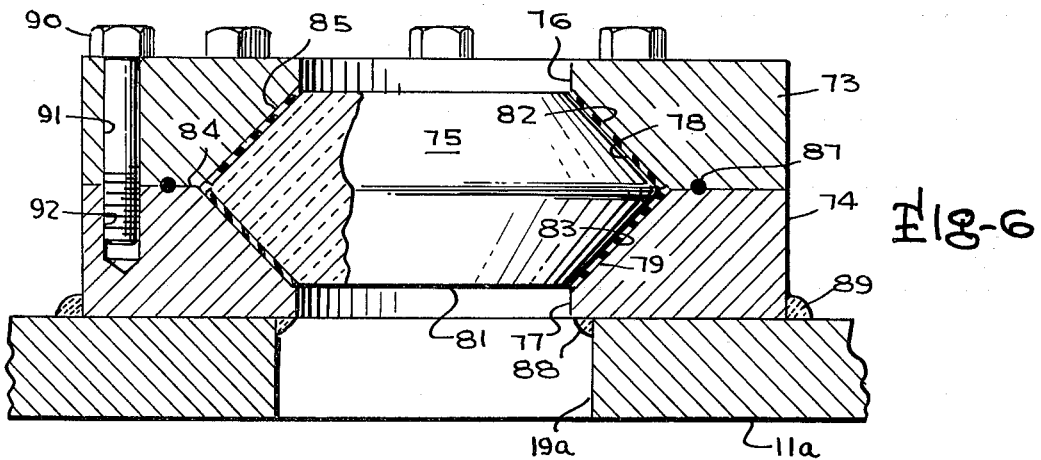
FIGS. 6 through 8 are views similar to the view of FIG. 2, illustrating additional embodiments of the invention.

In accordance with the broad aspects of the present invention, the invention relates to a sight glass assembly adapted to be mounted across an opening in a container wall, including a housing structure having an opening registrable with the opening in the container wall, the opening having an enlarged section including a pair of spaced opposed wall portions disposed in converging relation to each other, a lens disposed in the enlarged section of the opening having bearing surfaces cooperable with the opposed wall portions of the enlarged section of the housing structure, and sealing means interposed between the opposed wall portions of the enlarged section and the bearing surfaces of the lens.

In a specific embodimenet of the invention, the housing structure consists of a pair of mating sections detachably secured together, and each of the sections includes one of the opposed wall portions of the enlarged section of the opening. In addition to the primary sealing means which may consist of a gasket, a grease seal, or an adhesive seal, secondary sealing means are provided consiting of an O-ring disposed about the periphery of the lens, which engages the lens and each of the flanges.

Referring to the drawing, there is illustrated a sight glass assembly 10 embodying the invention, mounted on a wall 11 of a container containing a fluid under pressure. The sight glass assembly includes an outer housing section 12 and an inner housing section 13 which are adapted to be mated to from a housing structure, a lens 14 which is mounted between the housing sections, and O-rings 15, 16 and 17 which are mounted within the housing structure.

As best illustrated in FIG. 2, the inner housing section 13 is annular and is adapted to be mounted on the container wall 11 with the opening 18 thereof being disposed in registry with an opening 19 in the container wall. The opening in the housing section 13 is provided with an enlarged section defined by a conical wall 20 and a cylindrical wall 21. The housing section 12 is similar in configuration to the housing section 13 and is provided with an opening 22 having an enlarged section defined by a conical wall 23 and a cylindrical wall 24. The housing sections 12 and 13 are provided with mating surfaces 25 and 26 which are engageable to align the openings 18 and 22 and the cylindrical walls 21 and 24, so that the conical walls 20 and 23 will be spaced in opposed relation. As illustrated in FIG. 2, the conical walls 20 and 23 are disposed at acute angles relative to the centerline of aligned openings 18 and 22.

The lens 14 is adapted to be interposed between the housing sections when the sections are mated together as illustrated in FIG. 2. The lens includes a pair of parallel faces 27 and 28 which are disposed perpendicular to the centerline of the aligned openings 18 and 22, conical surfaces 29 and 30, and a cylindrical surface 31. As best shown in FIG. 2, the peripheral portion of the lens is received within the enlarged section of the opening in the housing structure defined by the walls 20, 21, 24 and 23.

A primary sealing means for the assembly consists of a gasket 32 interposed between the surface 29 of the lens and the wall 23 of the outer housing section 12, and a gasket 33 interposed between the surface 30 of the lens and the surface 20 of the inner housing section 13. The gaskets can be of any suitable material which is capable of forming a fluid-tight seal between the lens and the housing structure. In addition to a gasket, the primary sealing means may also consist of a grease or an adhesive seal.

A secondary sealing means for the assembly consists of a pair of O-rings 15 and 16 interposed between the perihery of the lens and the housing structure, and an O-ring 17 disposed between the two housing sections. To accommodate the O-rings 15 and 16, the cylindrical surface 31 of the lens has a diameter slightly less than the diameter of the cylindrical surfaces 21 and 24 of the housing sections, and the walls 21 and 24 are provided with peripheral grooves 34 and 35 in which the O-rings 15 and 16 are seated. In addition, the mating surfaces 25 and 26 of the housing sections are provided with aligned peripheral grooves 36 and 37 which accommodate the O-ring 17.

The housing sections are secured together and the assembly is secured to the container wall 11 by means of a plurality of bolts 38 which extend through a set of circumferentially spaced openings 39 in the housing section 12, a set of circumferentially spaced openings 40 in the housing section 13, and a set of circumferentially spaced threaded openings 41 in the container wall 11. As shown in FIG. 2, an annular gasket 42 is interposed between the housing section 13 and the container wall. It further is contemplated as an alternative construction that the housing section 13 be formed integral with the container wall 11.

In the use of the embodiment as illustrated in FIGS. 1 through 3, whenever pressure within the container is applied to the lens surface 28, the lens will be urged outwardly to compress the gasket 32 and thus form a fluid-tight seal between the lens surface 29 and the wall 23 of housing section 12. Simultaneously, the gasket 33 and O-rings 15 and 16 will further impede or prevent the passage of fluid between the lens and the housing structure. It further will be noted that the O-ring 17 will prevent leakage of fluid between the two housing sections. Similarly, when exterior pressure is applied on the lens surface 27, the lens 14 will be moved toward the container wall to compress the gasket 33 between the lens surface 30 and the wall 20 of the housing section 13 to form a fluid-tight seal between the lens surface 30 and the wall 20. The passage of fluid between the lens and the housing structure further is impeded or prevented by the gasket 32 and the O-rings 15 and 16. The O-ring 17 again prevents the leakage of fluid between the housing sections. It will be appreciated that the assembly can easily be assembled simply by placing the seals in position on the housing sections, placing the lens on the section 13, placing the housing section 12 on the lens and housing section 13 with the openings 39 and 40 disposed in registry, and then inserting the bolts 38 through the openings 39 and 40 to secure the assembly to the container wall. Whenever it becomes necessary to replace either the lens or any of the gaskets, the bolts 38 may easily be removed to disassemble the assembly and replace the defective component. The housing section 13 also may be formed integral with the container 11 or welded thereto, thus eliminating the gasket 42 and enhancing the strength of the assembly. In such a construction, the openings 40 would be threaded to receive the threaded ends of shorter bolts 38.

FIG. 4 illustrates a modification of the embodiment illustrated in FIGS. 1 throuh 3. The modification includes a pair of annular housing sections 43 and 44 and a lens 45. The housing sections 43 and 44 are provided with aligned openings 46 and 47 having enlarged sections defined by a pair of conical opposed walls 48 and 49 and a pair of cylindrical aligned walls 50 and 51. The lens 45 includes a pair of parallel faces 52 and 53, a pair of conical surfaces 54 and 55 and a cylindrical surface 56. A primary sealing means of the modification consists of a gasket 57 interposed between the lens surface 54 and the housing section wall 48, and a gasket 58 interposed between the lens surface 55 and the housing section wall 49. A secondary sealing means consists of an O-ring 59 which is seated in peripheral grooves in the housing sections 43 and 44 so that it is disposed at a juncture of the housing sections and the lens and engages each of them to provide a seal between the lens and the housing structure, and the two housing sections. The modification as illustrated in FIG., 4 is mounted on a container wall 11 in the same manner as described in connection with the embodiment of FIGS. 1 through 3.

The modification illustrated in FIG. 5 is similar to the modification illustrated in FIG. 4, and includes a pair of housing sections 60 and 61, and a lens 62 received within cooperating enlarged sections in the openings 63 and 64 of the housing sections. A primary sealing means consists of a gasket 65 interposed between the conical surface 66 of the lens and the similarly configured wall 67 of the housing section 60, and a gasket 68 interposed between the conical surface 69 of the lens and the similarly configured surface 70 of housing section 61. A secondary sealing means consists of an O-ring 71 disposed at the juncture of the housing sections 60 and 61 and the lens 62, and an O-ring 72 which is spaced from the O-ring 71 and interposed between the housing sections 60 and 61.

The primary and secondary sealing means of the modifications illustrated in FIGS. 4 and 5 operate similarly to the primary and secondary sealing means of the embodiment illustrated in FIGS. 1 through 3 to provide a fluid-tight seal between the lens and the housing structure, and between the two housing sections whether pressure is applied to the lens from the exterior or the interior of the assembly.

Figure 7:
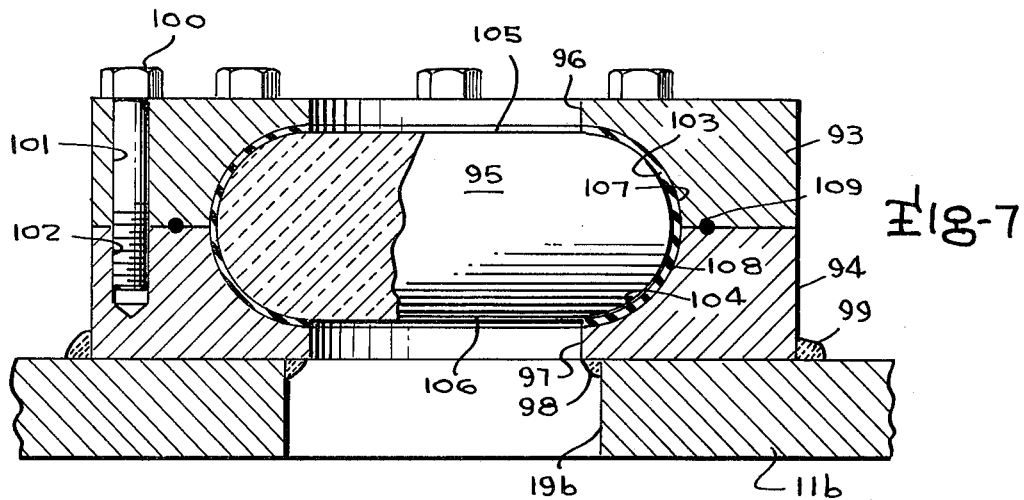
Figure 8:
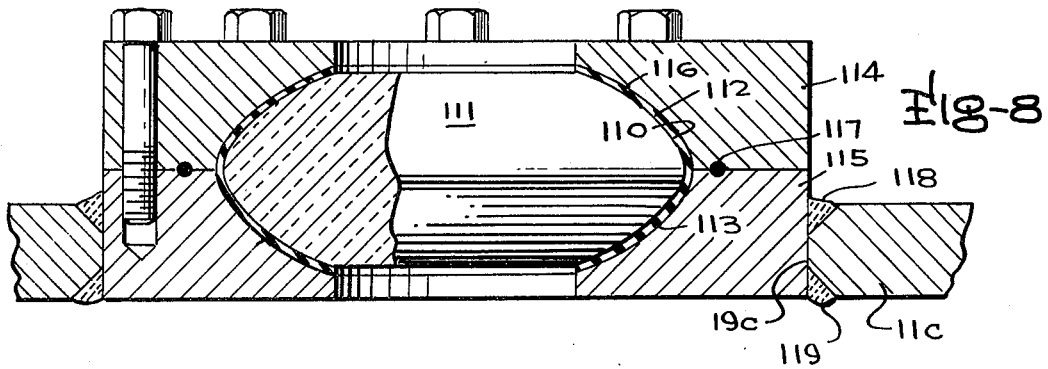

FIGS. 6 through 8 illustrate additional modifications of the embodiment of the invention shown in FIGS. 1 through 3. Referring to FIG. 6, the modification thereof includes a pair of annular housing sections 73 and 74 and a lens 75. The housing sections 73 and 74 are provided with aligned openings 76 and 77 having enlarged sections defined by a pair of opposed conical walls 78 and 79 which cooperate to form an apex at the junction of the two housing sections when the housing sections are secured together as illustrated in FIG. 6. The lens 75 is provided with a pair of parallel faces 80 and 81, and a pair of conical surfaces 82 and 83 which are complementary with the conical walls 78 and 79 of the housing sections 73 and 74. It will be noted, however, that the apex of the surfaces 82 and 83 of the lens, is rounded as at 84 so as to eliminate any sharp edges on the lens which may interfere with the mounting of the lens in the housing sections, or provide any areas of stress concentration.

The sealing means for the modification illustrated in FIG. 6 consists of a gasket 85 interposed between the lens surface 82 and the housing section wall 78, and a gasket 86 interposed between the lens surface 83 and the housing section wall 79. As an alternative arrangement, the gaskets 85 and 86 may be formed as a single gasket on the lens 75, so that the lens with the gasket mounted thereon can be installed in the housing structure as an integral unit. An additional sealing means consists of an O-ring 87 which is seated in aligned peripheral grooves in the mating surfaces of housing sections 73 and 74.

As in the previously described embodiments of the invention, the modification illustrated in FIG. 6 is adapted to be mounted on a container wall 11a so that the aligned openings 76 and 77 in the housing sections register with an opening 19a in the container wall. The housing section 74 is permanently secured to the container wall by means of weldments 88 and 89. The housing section 73 is detachably secured to the housing section 74 by means of a plurality of bolts 90 which extend through openings 91 in the housing section 73 and are threaded into aligned threaded openings 92 in the housing section 74.

Similar to the aforementioned embodiments, whenever pressure within the container 11a is applied to the inner surface 81 of the lens, the lens surface 82 will be urged against the wall section 78 to provide a fluid-tight seal between the lens 75 and the housing section 73, while the gasket 86 also functions to provide an additional seal between the lens and the housing structure. Leakage of fluid from within the container through the housing sections also is prevented by means of the O-ring 87.

When exterior pressure is applied to the lens surface 80, the lens surface 83 will be urged against the wall section 79 to provide a fluid tight seal between the lens and the housing section 74. In addition, the gasket 85 will also function as a seal between the lens and the housing structure.

FIG. 7 illustrates a modification of the previously described embodiments, which includes a pair of housing sections 93 and 94, and a lens 95. The housing sections have an annular configuration defining a pair of aligned openings 96 and 97 which are adapted to register with an opening 19b when the modification is mounted on a container wall 11b. As shown in FIG. 7, the housing section 94 is permanently secured to the container wall 11b by means of weldments 98 and 99, and the housing section 93 is detachably mounted on the housing section 94 by means of a plurality of bolts 100 which extend through openings 101 in the housing section 93 and are threaded into aligned threaded openings 102 in the housing sections 94.

The openings 96 and 97 in the housing sections are formed with enlarged sections defined by opposed walls 103 and 104, which cooperate to provide a continuous arcuate wall. The lens 95 is provided with a pair of parallel outer and inner face surfaces 105 and 106, and an arcuately configured peripheral suface 107 which is complementary with the cooperating arcuate surfaces 103 and 104 of the housing sections 93 and 94. Interposed between the arcuate surface 106 of the lens and the cooperating arcuate surfaces 103 and 104 of the housing sections is a gasket 108. The gasket 108 can be either of a one piece or two piece construction although it is contemplated that the gasket will be of a one piece construction and mounted on the arcuate wall 107 of the lens so that the lens with the gasket may be installed between the housing sections as an integral unit. The assembly also is provided with an O-ring 109 seated in a pair of grooves in the mating surfaces of the housing sections 93 and 94, which provides a seal between the housing sections to prevent leakage therebetween.

The modification illustrated in FIG. 7 functions similarly to the modification shown in FIG. 6 so that whenever internal pressure is applied on the inner surface 106 of the lens, the outer portion of the arcuate surface 107 of the lens will be urged toward the wall 103 of the housing section 93 to provide a fluid-tight seal between the lens and the housing section 93. Simultaneoulsy, the inner portion of the seal 108 also will function to provide a seal between the lens and the housing section 94, and the O-ring 109 will function to prevent leakage of fluid between the housing sections. When exterior pressure is applied on the outer surface 105 of the lens, the inner portion of the arcuately configured surface 107 of the lens will be urged against the wall 104 of the housing section 94 to provide a fluid-tight seal between the lens and the housing section 94. In addition, the outer portion of the gasket 108 will function to provide a seal between the lens and the housing section 93.

The modification illustrated in FIG. 8 is similar to the modification shown in FIG. 7 with the exception of the particular configurations of the peripheral surface 110 of the lens 111 and the corresponding walls 112 and 113 of the housing sections 114 and 115. As illustrated in FIG. 8, the peripheral surface of the lens 111 has an elliptical configuration and the walls 112 and 113 have a complementary elliptical configuration when the housing sections 114 and 115 are secured together with the lens 111 mounted therebetween, as illustrated in FIG. 8. Similar to the modification illustrated in FIG. 7, a sealing gasket 116 is interposed between the peripheral wall 110 of the lens and the walls 112 and 113 of the housing sections, and an O-ring 117 is provided between the two housing sections. The modification of FIG. 8 functions in a manner similar to that previously described in connection with the modifications of FIGS. 6 and 7.

In any of the aforementioned embodiments and modifications, the inner housing section may be permanently secured to the container wall, as by welding, and the outer housing sections may be detachably secured to the inner housing section, as perhaps by bolting, or both of the housing sections may be detachably secured to the container wall as illustrated in FIGS. 1 through 3. It further is contemplated that the inner housing section of the assembly may be mounted on the container wall, with the opening thereof registered with the opening in the container wall, or the inner housing section may be mounted within the opening in the container wall, as illustrated in FIG. 8. As shown therein, the housing section 115 is mounted within the opening 19c of the container wall 11c and permanently secured thereto by means of weldments 118 and 119.

Additionally, it is contemplated that the lenses of the aforementioned embodiments and modifications may be formed of glass, plastic or any other suitable material, depending on the particular specifications of the user. The particular material of the housing sections of the assembly and the materials for the sealing means also would depend upon the particular specifications of the user.

From the foregoing detailed description, it will be evident that there are a number of changes, adaptations and modifications of the present invention which come within the province of those skilled in the art. However, it is intented that all such variations not departing from the spirit of the invention be considered as within the scope and thereof as limited solely by the appended claims.

I claim:

1. A sight glass assembly comprising a housing structure having an opening therethrough, said opening having an enlarged section including a pair of spaced, opposed wall portions, disposed in converging relation, a lens disposed in said enlarged section of said opening having interior and exterior faces and bearing surfaces adjacent said interior and exterior lens faces cooperable with said wall sections, and resilient sealing means interposed between said wall portions of said enlarged section of said opening and said bearing surfaces of said lens whereby upon application of pressure on one of said lens faces, said sealing means disposed between the nearer lens bearing surface and a cooperating housing wall portion, will function to provide an initial sealing action, and said sealing means disposed between the further lens bearing surface and a cooperating housing wall portion, will function to provide an additional, main sealing action.

2. A sight glass assembly according to claim 1, wherein said wall sections are curved.

3. A sight glass assembly according to claim 1, wherein said wall sections are arcuately configured in cross-section.

4. A sight glass assembly according to claim 1, wherein said wall sections have a cross-sectional configuration consisting of a section of an ellipse.

5. A sight glass assembly comprising a housing structure having an opening therethrough, said opening having an enlarged section including a pair of spaced opposed wall portions, disposed at acute angles relative to the centerline of said opening, a lens disposed in said enlarged section of said opening having an intermediate surface and adjacent bearing surfaces cooperable with said wall portions, primary, resilient sealing means interposed between said wall portions and said adjacent bearing surfaces of said lens, and secondary, resilient sealing means disposed between said intermediate surface and said housing structure.

6. A sight glass assembly according to claim 5, wherein said opposed wall portions of said enlarged section of said opening, are conically configured.

7. A sight glass assembly according to claim 5, wherein the wall portions of said enlarged section of said opening, are conically configured and said enlarged section includes a cylindrically configured wall portion disposed between said opposed wall portions.

8. A sight glass assembly according to claim 5, wherein said primary resilient sealing means comprises a gasket.

9. A sight glass assembly according to claim 5, wherein said secondary resilient sealing means comprises at least one O-ring seal.

10. A sight glass assembly according to claim 5, wherein said opposed wall portions of said enlarged section of said opening, are conically configured, said enlarged section of said opening includes a cylindrical wall portion between said opposed wall portion, said primary, resilient sealing means comprises gaskets and said secondary, resilient sealing means comprises at least one O-ring seal interposed between said cylindrical wall portion of the enlarged section of said opening and the intermediate surface of said lens.

11. A sight glass assembly according to claim 5, wherein said housing structure includes a pair of mating members detachably secured together, and each of said members includes one of said opposed wall portions of said enlarged section of said opening.

12. A sight glass assembly according to claim 11, wherein said secondary, resilient sealing means comprises a seal disposed between the intermediate surface of said lens and each of said mating members.

13. A sight glass assembly according to claim 11, wherein said bearing surfaces are conically configured.

14. A sight glass assembly according to claim 11, wherein said secondary, resilient sealing means comprises a pair of spaced seals disposed about the periphery of said lens, each of which engages said intermediate surface of said lens and one of said mating members.

15. A sight glass assembly according to claim 14, wherein said bearing surfaces are conically configured.

16. A sight glass assembly according to claim 11, wherein said secondary, resilient sealing means comprises a seal disposed about the periphery of said lens which engages said intermediate surface of said lens and each of said mating members, and a seal disposed between said mating members.

17. A sight glass assembly according to claim 16, wherein said bearing surfaces are conically configured.

18. A sight glass assembly according to claim 11, wherein said secondary, resilient sealing means comprises a pair of sealing means disposed about the periphery of said lens, each of which engages said intermediate surface of said lens and one of said mating members, and a seal disposed between said mating members.

19. A sight glass assembly according to claim 18, wherein said bearing surfaces are conically configured.

* * * * *